United States Patent
Bysted et al.

(10) Patent No.: US 7,437,174 B2
(45) Date of Patent: Oct. 14, 2008

(54) RECEIVED SIGNAL QUALITY DETERMINATION

(75) Inventors: Tommy Kristensen Bysted, Smoerum (DK); Benoist Sebire, Beijing (CN)

(73) Assignee: Spyder Navigations L.L.C., Wilmington, DE (US)

( * ) Notice: Subject to any disclaimer, the term of this patent is extended or adjusted under 35 U.S.C. 154(b) by 696 days.

(21) Appl. No.: 10/825,401

(22) Filed: Apr. 15, 2004

(65) Prior Publication Data

US 2005/0232201 A1   Oct. 20, 2005

(51) Int. Cl.
*H04B 7/005* (2006.01)
(52) U.S. Cl. .......................... 455/522; 455/69; 370/333
(58) Field of Classification Search ................. 455/522, 455/69, 436, 437, 442, 127.1; 370/318, 331, 370/333
See application file for complete search history.

(56) References Cited

U.S. PATENT DOCUMENTS

| | | | |
|---|---|---|---|
| 6,654,922 B1 | 11/2003 | Numminen et al. | 714/748 |
| 6,983,166 B2 * | 1/2006 | Shiu et al. | 455/522 |
| 7,027,828 B2 * | 4/2006 | Kim et al. | 455/522 |
| 7,266,384 B2 * | 9/2007 | Kim et al. | 455/522 |
| 2002/0115443 A1 * | 8/2002 | Freiberg et al. | 455/450 |
| 2004/0137860 A1 * | 7/2004 | Oh et al. | 455/127.1 |
| 2005/0143112 A1 * | 6/2005 | Jonsson | 455/522 |
| 2005/0143116 A1 * | 6/2005 | Hsu et al. | 455/522 |

FOREIGN PATENT DOCUMENTS

EP   1067730 A1   10/2001

OTHER PUBLICATIONS

Silventoinen, M., "Fast Power Control for GSM HBS Using Training Sequences", Vehicular Technology Conference, 1997, Phoenix, AZ., vol. 3, pp. 1689-1693.
Mouly, M., et al., "The GSM System for Mobile Communications", Cell & Sys, 1992, Palaiseau, France, pp. 231-234.

* cited by examiner

*Primary Examiner*—Blane J Jackson
(74) *Attorney, Agent, or Firm*—Connolly Bove Lodge & Hutz LLP (57) ABSTRACT

A method of generating a received signal quality signal in a communication system, the method comprising: receiving a signal from a physical channel, extracting a transport channel format combination indicator from the received signal, processing one or more transport channel signals, contained in the received signal, in accordance with the extracted transport channel format combination indicator, said processing including at least channel decoding, and generating a received signal quality signal in dependence on the quality of the or each transport channel signal prior to channel decoding.

25 Claims, 13 Drawing Sheets

| FIG.4A |
|--------|
| FIG.4B |

RECEIVED SIGNAL QUALITY DETERMINATION

FIELD OF THE INVENTION

The present invention relates to the determination of received signal quality in a radio communication system.

BACKGROUND TO THE INVENTION

In a radio communication network, such as a mobile phone network, mobile stations monitor the quality of received signals and report the received signal quality back to a base station, typically in a control channel.

It has been proposed that a mobile station report received signal quality in a slow associated control channel (SACCH) using a three bit code. The signal quality is determined as the bit error rate (BER) of the received signal before channel decoding and is averaged over one SACCH multiframe, for example 480 ms.

The BER is only used if the a block is correctly received, i.e. it passes a CRC (cyclic redundancy code) check. If a block is not correctly received, a default notional BER of, for example 50%, is assumed.

SUMMARY OF THE INVENTION

According to a first aspect of the present invention, there is provided a method of generating a received signal quality signal in a communication system, the method comprising:
 receiving a signal from a physical channel;
 extracting a transport channel format combination indicator from the received signal;
 processing one or more transport channel signals, contained in the received signal, in accordance with the extracted transport channel format combination indicator; said processing including at least channel decoding; and
 generating a received signal quality signal in dependence on the quality of the or each transport channel signal prior to channel decoding.

According to the first aspect of the present invention, there is also provided a communication device comprising:
 a receiver for receiving a signal from a physical channel;
 processing means configured for:
  extracting a transport channel format combination indicator from the received signal;
  processing one or more transport channel signals, contained in the received signal, in accordance with the extracted transport channel format combination indicator; said processing including at least channel decoding; and
  generating a received signal quality signal in dependence on the quality of the or each transport channel signal prior to channel decoding.

The or each transport channel signal may comprise a sequence of data blocks. The quality of the or each transport channel signal may be represented by a block bit error rate determined prior to channel decoding. The determined bit error rate of a transport channel signal may be averaged over period comprising a plurality of data blocks. In the case of there being a plurality of transport channel signals, the bit error rates of each transport channel signal may be averaged over the same period. An average bit error rate may be calculated across the transport channel signals with the averaging being weighted in dependence on the transport formats used for said transport signals.

The received signal quality signal may be transmitted in a control channel.

According to a second aspect of the present invention, there is provided a method of generating a received signal quality signal in a communication system, the method comprising:
 receiving a signal from a physical channel, the signal comprising one or more transport channels;
 extracting a transport channel format combination indicator from the received signal and determining the bit error rate therefore; and
 generating a received signal quality signal in dependence on the bit error rate of the extracted transport channel format combination indicator.

According to the second aspect of the present invention, there is also provided a communication device comprising:
 a receiver for receiving a signal from a physical channel, the signal comprising one or more transport channels; and
 processing means configured for:
  extracting a transport channel format combination indicator from a received signal and determining the bit error rate therefore; and
  generating a received signal quality signal in dependence on the bit error rate of the extracted transport channel format combination indicator.

The determined bit error rates of a plurality of transport channel format combination indicator instances may be averaged.

The received signal quality signal may be transmitted in a control channel.

According to a third aspect of the present invention, there is provided a method of generating a received signal quality signal in a communication system, the method comprising:
 receiving a signal from a physical channel, the signal comprising a plurality of bursts each including a training sequence; and
 generating a received signal quality signal in dependence on the bit error rate of the training sequence of a received burst.

According to the third aspect of the present invention, there is also provided a communication device comprising:
 a receiver for receiving a signal from a physical channel, the signal comprising a plurality of bursts each including a training sequence; and
 processing means configured for generating a received signal quality signal in dependence on the bit error rate of the training sequence of a received burst.

The determined bit error rates of the training sequences of a plurality of bursts may be averaged.

The bit error rate of a training sequence may be produced by comparing a received training sequence with a reference training sequence.

The received signal quality signal may be transmitted in a control channel.

DETAILED DESCRIPTION OF EMBODIMENTS

Embodiments of the present invention will now be described, by way of example, with reference to the accompanying drawings.

Figure 1:
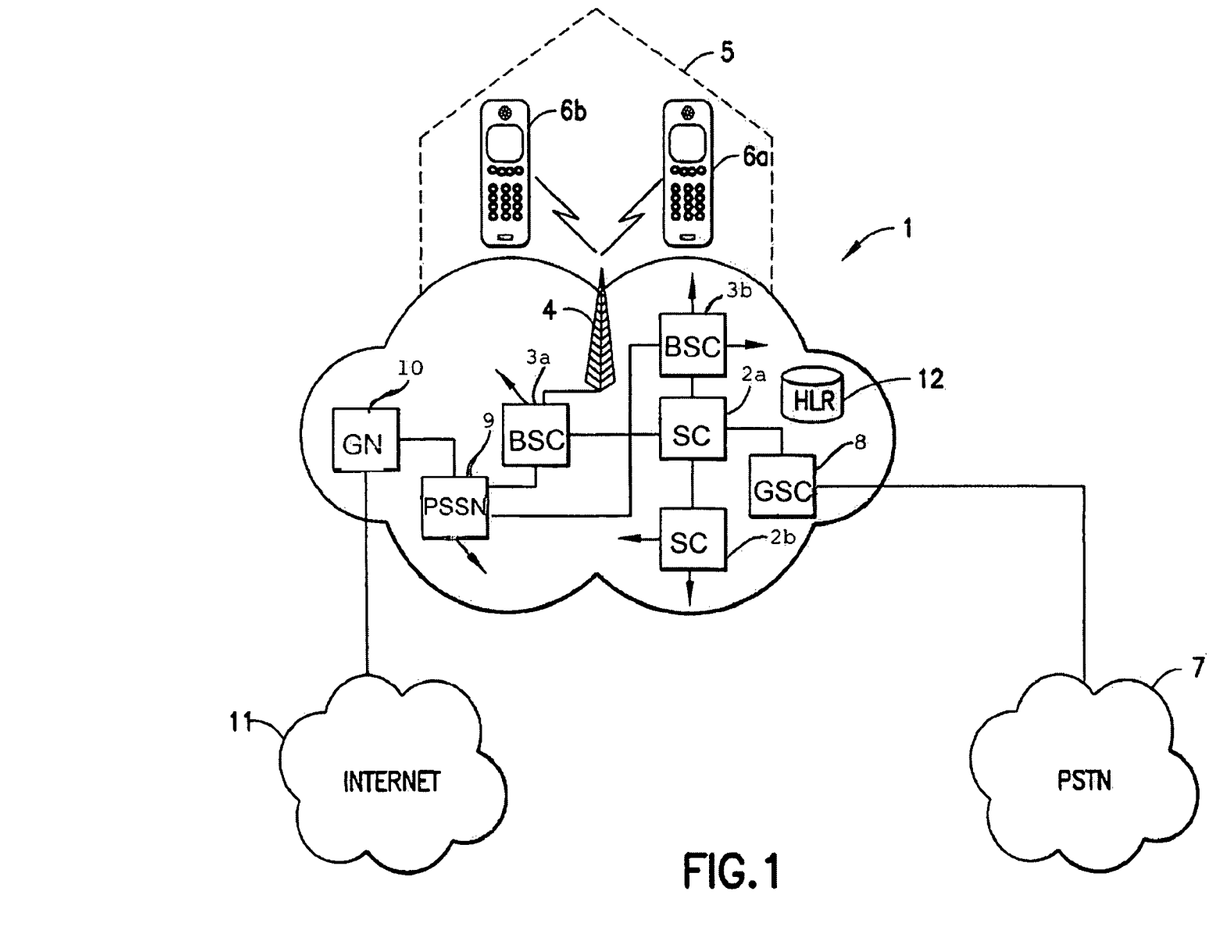
FIG. 1 shows a mobile communication system according to the present invention.

Referring to FIG. 1, a mobile phone network 1 comprises a plurality of switching centres including first and second switching centres 2a, 2b. The first switching centre 2a is connected to a plurality of base station controllers including first and second base station controllers 3a, 3b. The second switching centre 2b is similarly connected to a plurality of base station controllers (not shown).

The first base station controller 3a is connected to and controls a base transceiver station 4 and a plurality of other base transceiver stations. The second base station controller 3b is similarly connected to and controls a plurality of base transceiver stations (not shown).

In the present example, each base transceiver station services a respective cell. Thus, the base transceiver station 4 services a cell 5. However, a plurality of cells may be serviced by one base transceiver station by means of directional antennas. A plurality of mobile stations 6a, 6b are located in the cell 5. It will be appreciated what the number and identities of mobile stations in any given cell will vary with time.

The mobile phone network 1 is connected to a public switched telephone network 7 by a gateway switching centre 8.

A packet service aspect of the network includes a plurality of packet service support nodes (one shown) 9 which are connected to respective pluralities of base station controllers 3a, 3b. At least one packet service support gateway node 10 connects the or each packet service support node 10 to the Internet 11.

The switching centres 3a, 3b and the packet service support nodes 9 have access to a home location register 12.

Communication between the mobile stations 6a, 6b and the base transceiver station 4 employs a time-division multiple access (TD MA) scheme.

Figure 2:
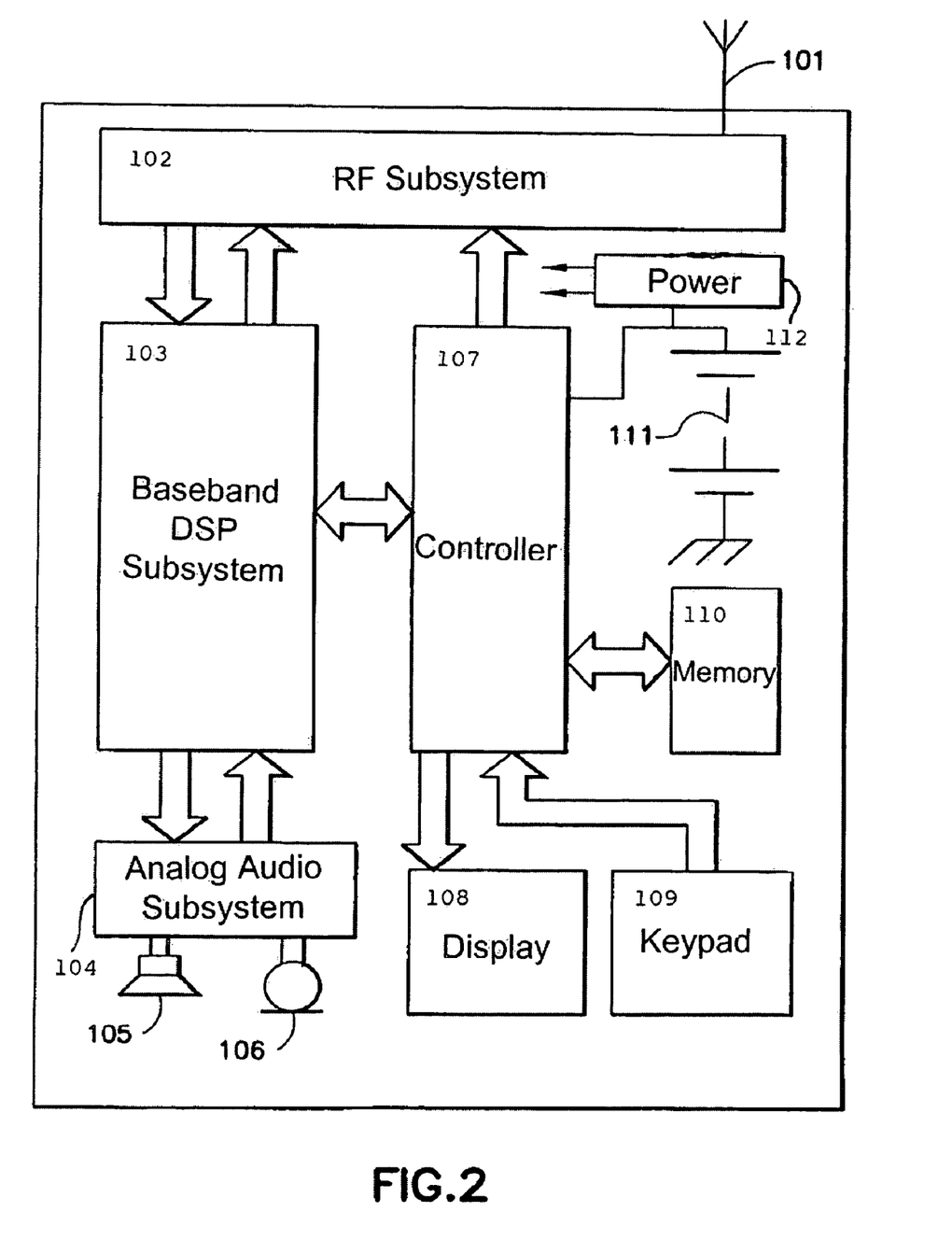
FIG. 2 is a block diagram of a mobile station.

Referring to FIG. 2, the first mobile station 6a comprises an antenna 101, an rf subsystem 102, a baseband DSP (digital signal processing) subsystem 103, an analogue audio subsystem 104, a loudspeaker 105, a microphone 106, a controller 107, a liquid crystal display 108, a keypad 109, memory 110, a battery 111 and a power supply circuit 112.

The rf subsystem 102 contains if and rf circuits of the mobile telephone's transmitter and receiver and a frequency synthesizer for tuning the mobile station's transmitter and receiver. The antenna 101 is coupled to the rf subsystem 102 for the reception and transmission of radio waves.

The baseband DSP subsystem 103 is coupled to the rf subsystem 102 to receive baseband signals therefrom and for sending baseband modulation signals thereto. The baseband DSP subsystems 103 includes codec functions which are well-known in the art.

The analogue audio subsystem 104 is coupled to the baseband DSP subsystem 103 and receives demodulated audio therefrom. The analogue audio subsystem 104 amplifies the demodulated audio and applies it to the loudspeaker 105. Acoustic signals, detected by the microphone 106, are pre-amplified by the analogue audio subsystem 104 and sent to the baseband DSP subsystem 4 for coding.

The controller 107 controls the operation of the mobile telephone. It is coupled to the rf subsystem 102 for supplying tuning instructions to the frequency synthesizer and to the baseband DSP subsystem 103 for supplying control data and management data for transmission. The controller 107 operates according to a program stored in the memory 110. The memory 110 is shown separately from the controller 107. However, it may be integrated with the controller 107.

The display device 108 is connected to the controller 107 for receiving control data and the keypad 109 is connected to the controller 107 for supplying user input data signals thereto.

The battery 111 is connected to the power supply circuit 112 which provides regulated power at the various voltages used by the components of the mobile telephone.

The controller 107 is programmed to control the mobile station for speech and data communication and with application programs, e.g. a WAP browser, which make use of the mobile station's data communication capabilities.

The second mobile station 6b is similarly configured.

Figure 3:
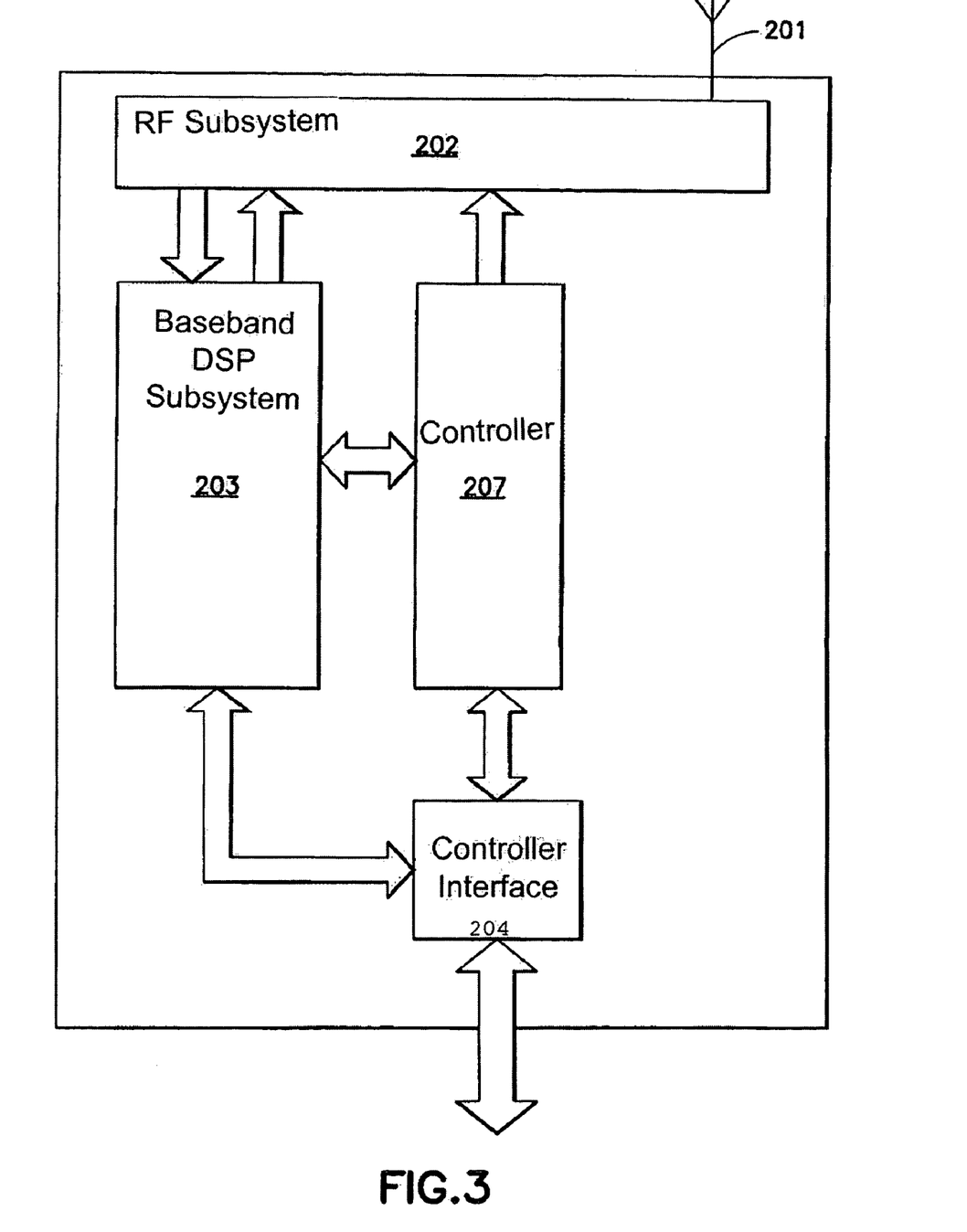
FIG. 3 is a block diagram of a base transceiver station.

Referring to FIG. 3, greatly simplified, the base transceiver station 4 comprises an antenna 201, an rf subsystem 202, a baseband DSP (digital signal processing) subsystem 203, a base station controller interface 204 and a controller 207.

The rf subsystem 202 contains the if and rf circuits of the base transceiver station's transmitter and receiver and a frequency synthesizer for tuning the base transceiver station's transmitter and receiver. The antenna 201 is coupled to the rf subsystem 202 for the reception and transmission of radio waves.

The baseband DSP subsystem 203 is coupled to the rf subsystem 202 to receive baseband signals therefrom and for sending baseband modulation signals thereto. The baseband DSP subsystems 203 includes codec functions which are well-known in the art.

The base station controller interface 204 interfaces the base transceiver station 4 to its controlling base station controller 3a.

The controller 207 controls the operation of the base transceiver station 4. It is coupled to the rf subsystem 202 for supplying tuning instructions to the frequency synthesizer and to the baseband DSP subsystem for supplying control data and management data for transmission. The controller 207 operates according to a program stored in the memory 210.

Figures 4, 4A:
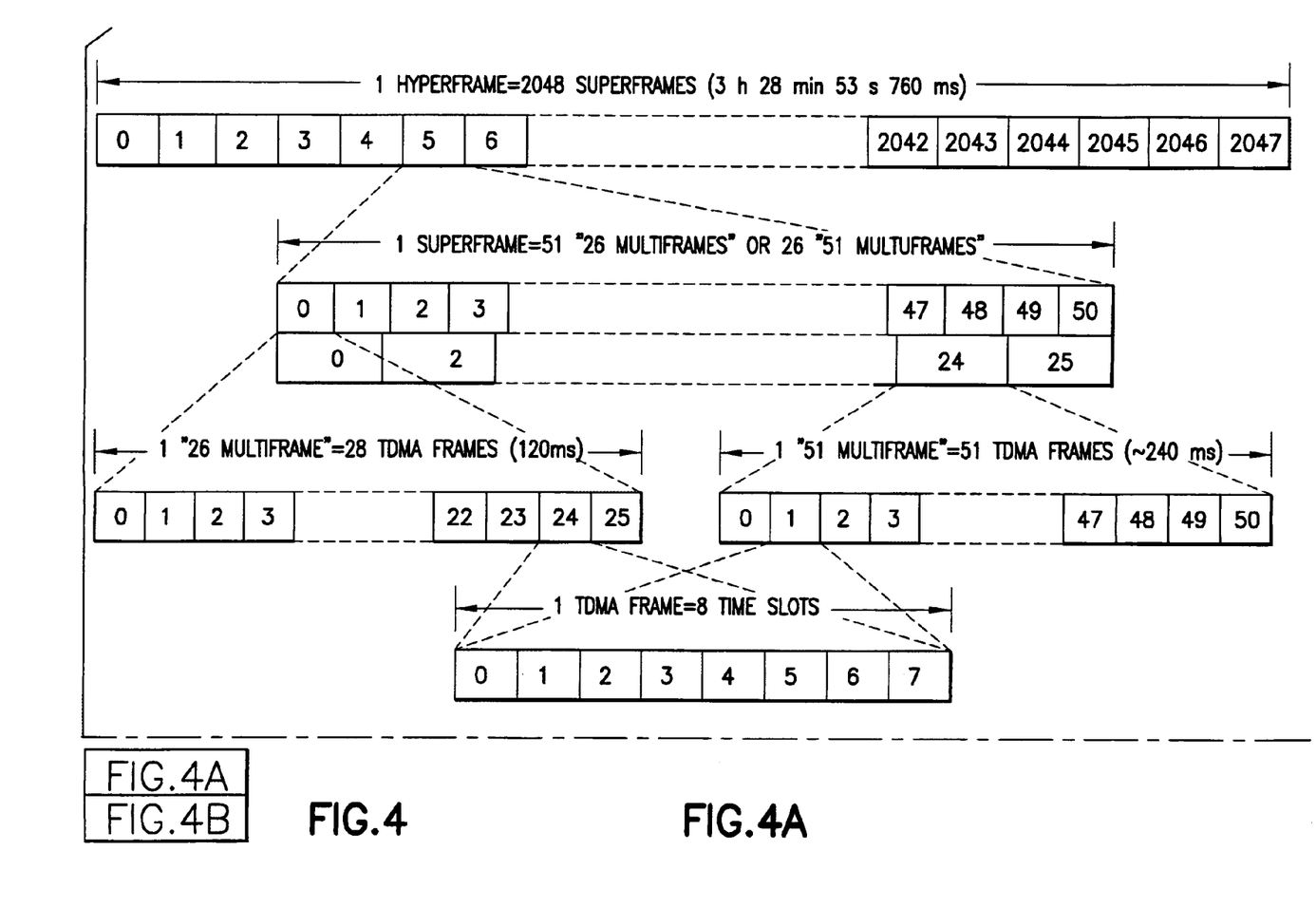
FIG. 4 illustrates the frame structure.
Figure 4B:
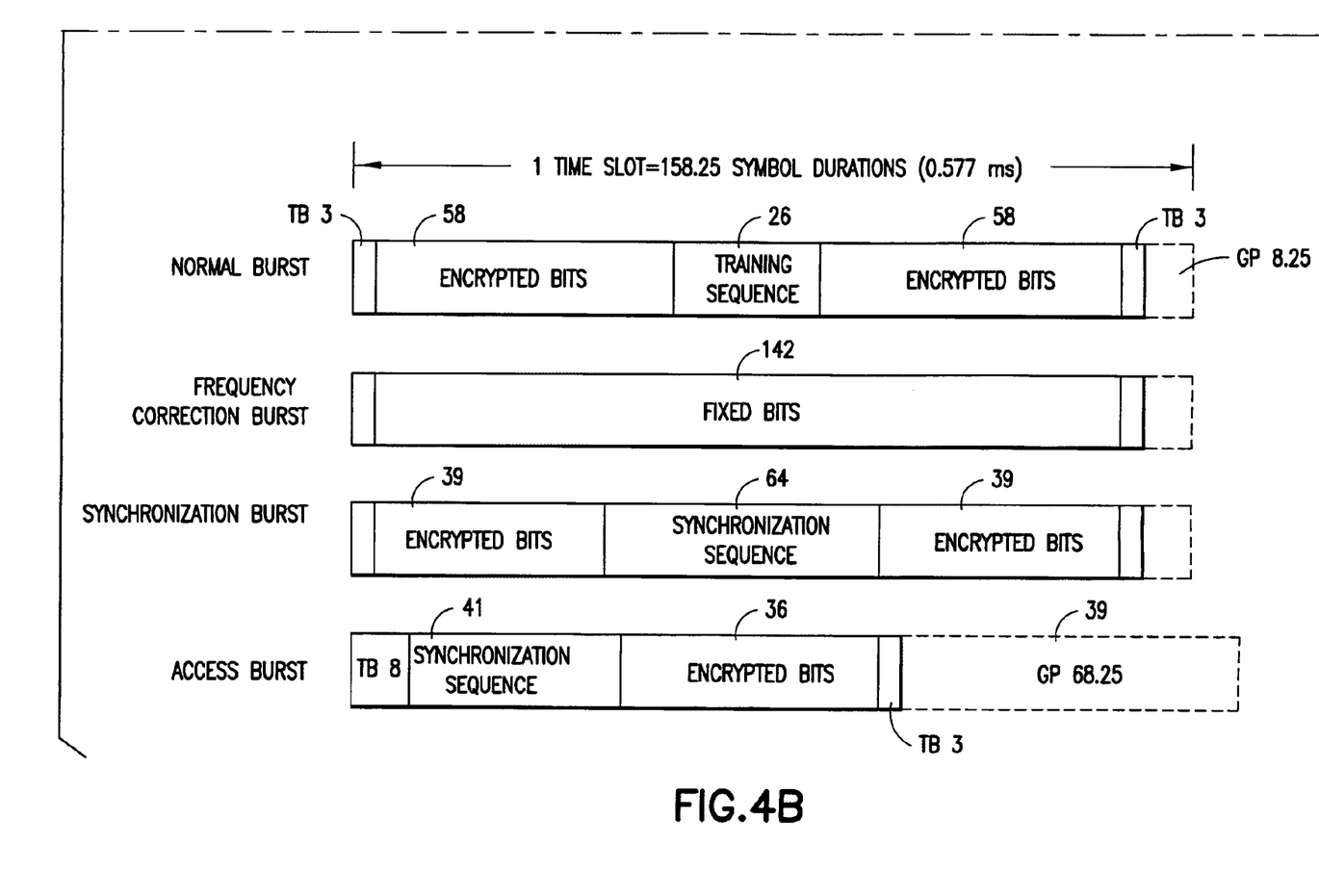

Referring to FIG. 4, each TDMA frame, used for communication between the mobile stations 6a, 6b and the base transceiver stations 4, comprises eight 0.577 ms time slots. A "26 multiframe" comprises 26 frames and a "51 multiframe" comprises 51 frames. Fifty one "26 multiframes" or twenty six "51 multiframes" make up one superframe. Finally, a hyperframe comprises 2048 superframes.

The data format within the time slots varies according to the function of a time slot. A normal burst, i.e. time slot, comprises three tail bits, followed by 58 encrypted data bits, a 26-bit training sequence, another sequence of 58 encrypted data bits and a further three tail bits. A guard period of eight and a quarter bit durations is provided at the end of the burst. A frequency correction burst has the same tail bits and guard period. However, its payload comprises a fixed 142 bit sequence. A synchronization burst is similar to the normal burst except that the encrypted data is reduced to two clocks of 39 bits and the training sequence is replaced by a 64-bit synchronization sequence. Finally, an access burst comprises eight initial tail bits, followed by a 41-bit synchronization sequence, 36 bits of encrypted data and three more tail bits. In this case, the guard period is 68.25 bits long.

When used for circuit-switched speech traffic, the channelization scheme is as employed in GSM.

Figure 5:
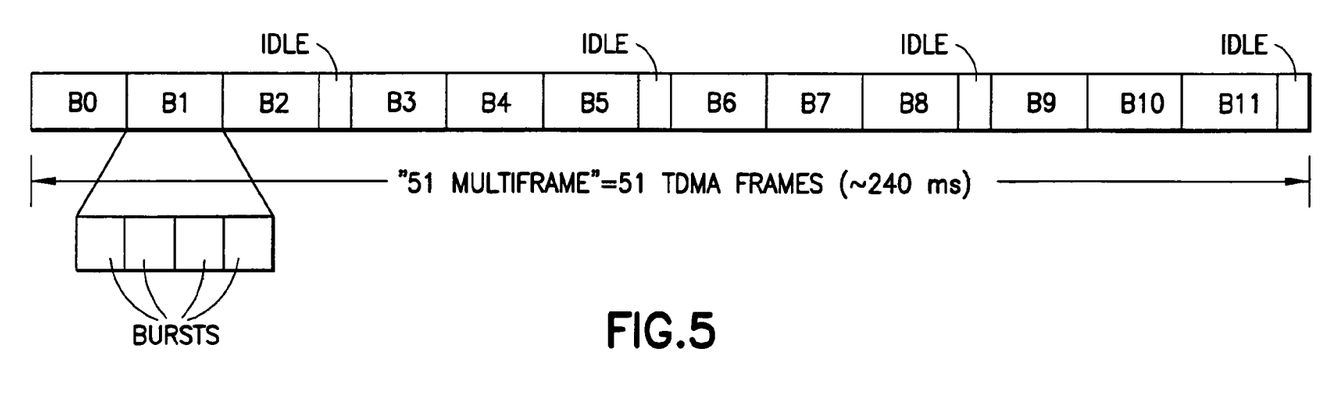
FIG. 5 illustrates a packet data channel.

Referring to FIG. 5, full rate packet switched channels make use of 12 4-slot radio packets spread over a "51 multi-frame". Idle slots follow the third, sixth, ninth and twelfth radio packet.

Figure 6:
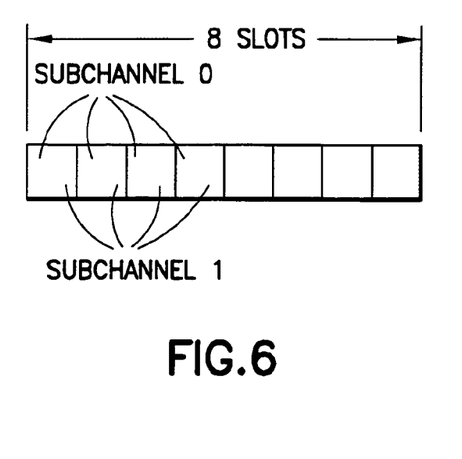
FIG. 6 illustrates the sharing of a radio channel between two half-rate packet channels.

Referring to FIG. 6, for half rate, packet switched channels, both dedicated and shared, slots are allocated alternately to two sub-channels.

The baseband DSP subsystems 103, 203 and controllers 107, 207 of the mobile stations 6a, 6b and the base transceiver stations 4 are configured to implement two protocol stacks. The first protocol stack is for circuit switched traffic and is substantially the same as employed in conventional GSM systems. The second protocol stack is for packet switched traffic.

Figure 7:
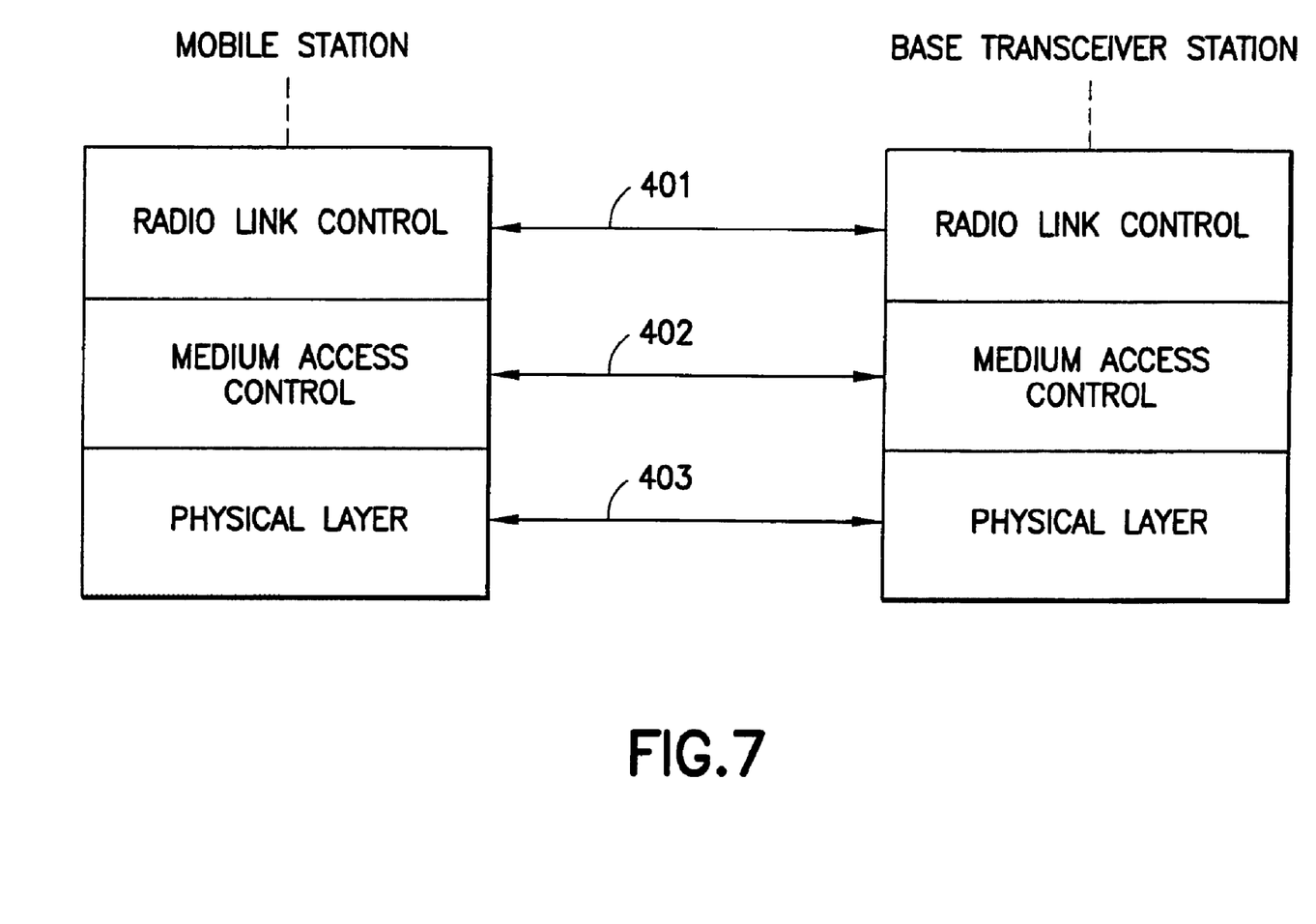
FIG. 7 illustrates the lower levels of a protocol stack.

Referring to FIG. 7, the layers relevant to the radio link between a mobile station 6a, 6b and a base station controller 4 are the radio link control layer 401, the medium access control layer 402 and the physical layer 403.

The radio link control layer 401 has two modes: transparent and non-transparent. In transparent mode, data is merely passed up or down through the radio link control layer without modification.

In non-transparent mode, the radio link control layer 401 provides link adaptation and constructs data blocks from data units received from higher levels by segmenting or concatenating the data units as necessary and performs the reciprocal process for data being passed up the stack. It is also responsible for detecting lost data blocks or reordering data block for upward transfer of their contents, depending on whether acknowledged mode is being used. This layer may also provide backward error correction in acknowledged mode.

The medium access control layer 402 is responsible for allocating data blocks from the radio link control layer 401 to appropriate transport channels and passing received radio packets from transport channels to the radio link control layer 403.

The physical layer 403 is responsible to creating transmitted radio signals from the data passing through the transport channels and passing received data up through the correct transport channel to the medium access control layer 402.

Figure 8:
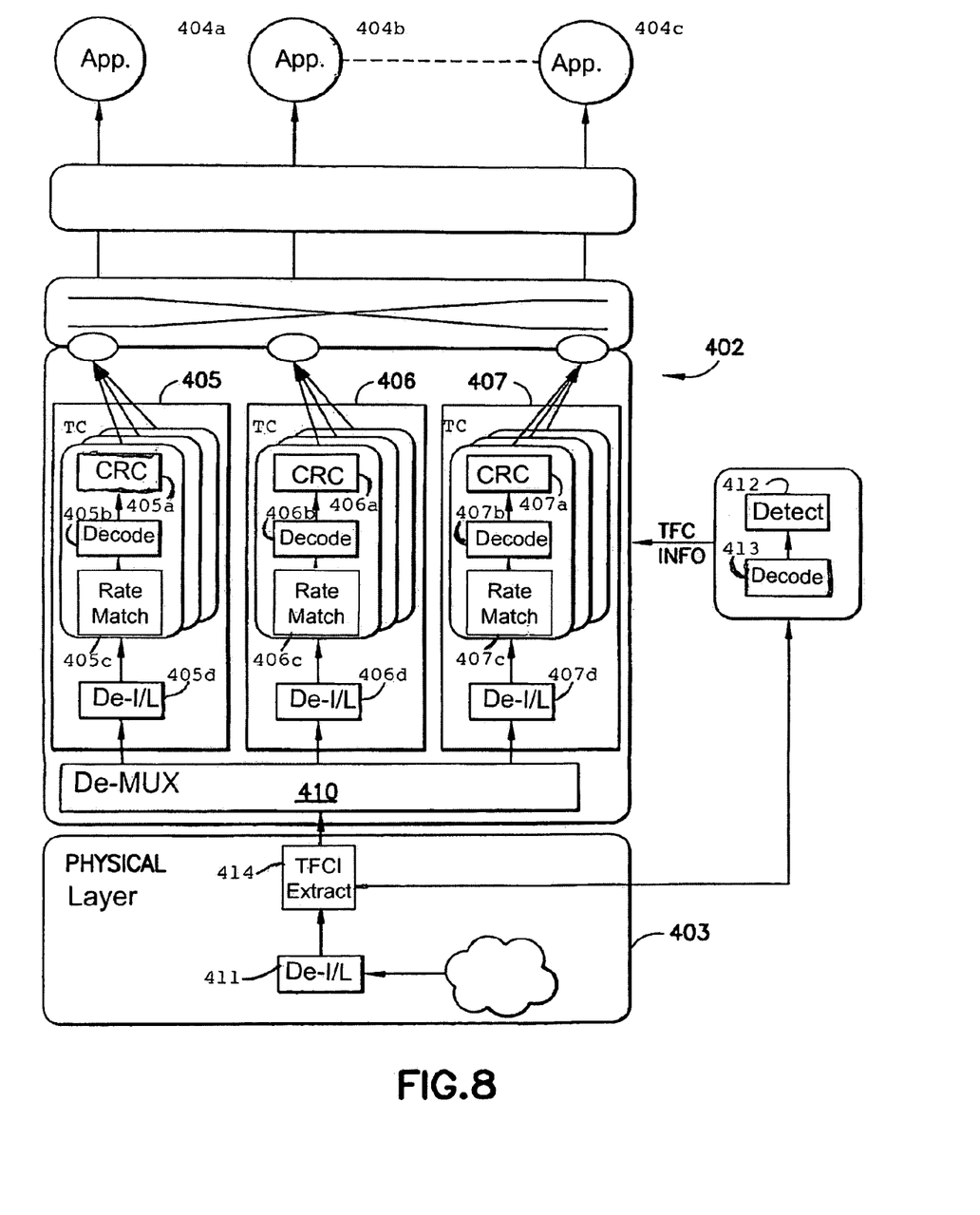
FIG. 8 is a block diagram illustrating the processing of the transport channels of a received physical layer signal.

Referring to FIG. 8, data produced for applications 404a, 404b, 404c propagates up the protocol stack from the medium access control layer 402. The data from the applications 404a, 404b, 404c can belong to any of a plurality of classes for which different qualities of service are required. Data belonging to a plurality of classes may be required by a single application. The medium access control layer 402 directs data to the applications 404a, 404b, 404c from different transport channels 405, 406, 407 according to class to which it belongs.

Each receive transport channel 405, 406, 407 can be configured to process received signals according to a plurality of processing schemes 405a, 405b, 405c, 406a, 406b, 406c, 407a, 407b, 407c. The configuration of the transport channels 405, 406, 407 is established during call setup on the basis of the capabilities of the mobile station 6a, 6b and the network and the nature of the application or applications 404a, 404b, 404c being run.

The processing schemes 405a, 405b, 405c, 406a, 406b, 406c, 407a, 407b, 407c are unique combinations of cyclic redundancy check 405a, 406a, 407a, channel decoding 405b, 406b, 407b and rate matching 405c, 406c, 407c. These unique processing schemes are the reciprocals of transmitter processing schemes which define different "transport formats". An interleaving scheme may be selected for each transport channel 405, 406, 407 and require corresponding de-interleaving 405d, 406d, 407d. Thus, different transport channels may use different interleaving schemes and, in alternative embodiments, different interleaving schemes may be used at different times by the same transport channel.

The combined data rate produced for the transport channels 405, 406, 407 must not exceed that of physical channel or channels allocated to the mobile station 6a, 6b. This places a limit on the transport format combinations that can be permitted. For instance, if there are three transport formats TF1, TF2, TF3 for each transport channel, the following combinations might be valid:

TF1 TF1 TF2
TF1 TF3 TF3 but not

TF1 TF2 TF2
TF1 TF1 TF3

The received signal is de-interleaved 411 and then demultiplexed by a demultiplexing process 410, which outputs transport channel signals to respective transport channel de-interleaving processes 405d, 406d, 407d.

A transport format combination indicator is spread across one radio packet with portions placed in fixed positions in each burst, on either side of the training symbols (FIG. 9) in this example. The complete transport format combination indicator therefore occurs at fixed intervals, i.e. the block length 20 ms. This makes it possible to ensure transport format combination indicator detection when different interleaving types are used e.g. 8 burst diagonal and 4 burst rectangular interleaving. Since the transport format combination indicator is not subject to variable interleaving, it can be readily located by the receiving station and used to control processing of the received data.

The transport format combination indicator is extracted from the received data stream by a transport format combination indicator extraction process 414 after the deinterleaving process 411.

The transport format combination indicator from the transport format combination indicator extraction process 414 is decoded by a decoding process 413. The decoded transport format combination indicator is then processed by a transport format combination detecting process 412 which provides information on the current transport format combination to the medium access control layer 402. This information is then used in the medium access control layer 402 to select the appropriate decoding and de-interleaving process for the transport formats used in the received signal.

Figure 9:
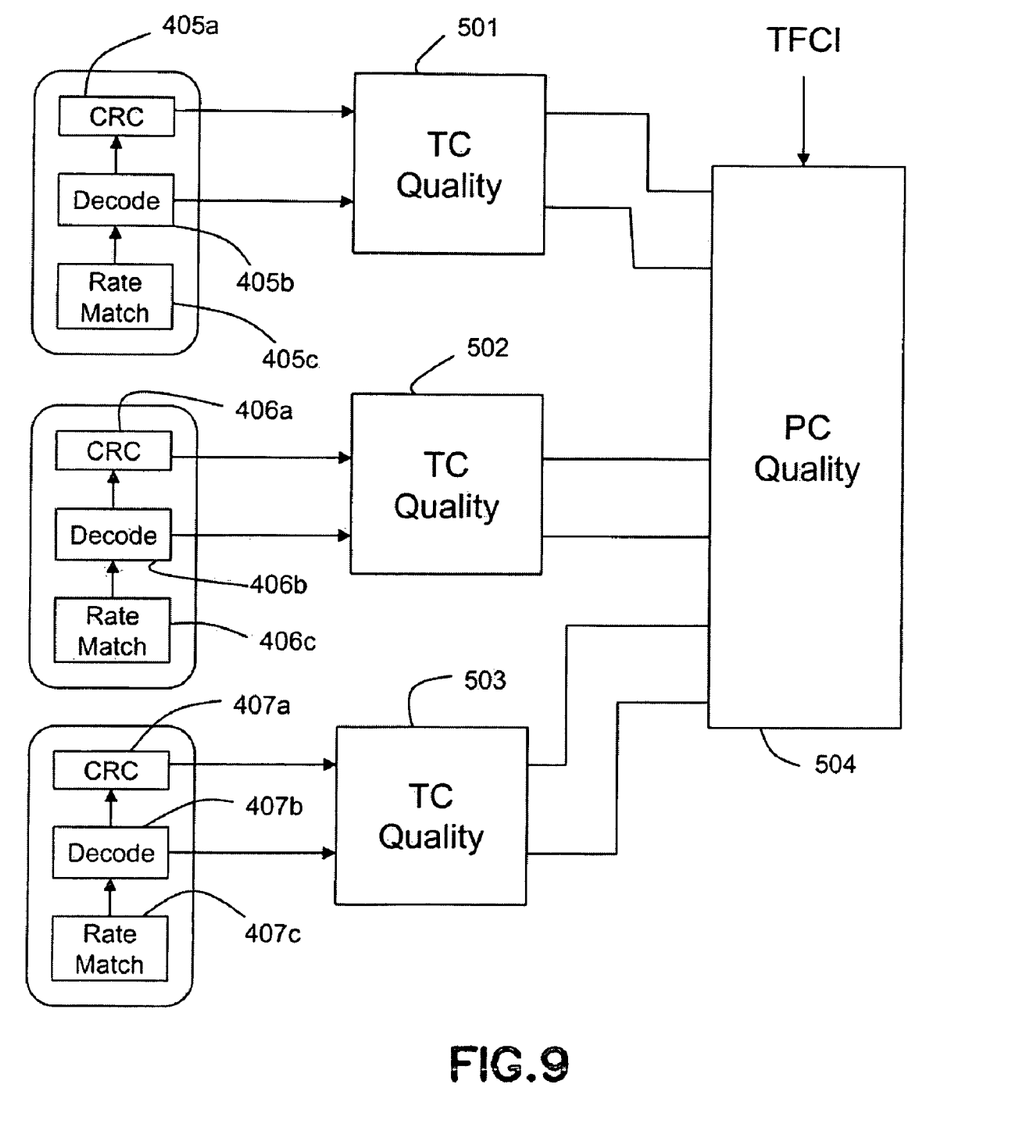
FIG. 9 is a block diagram illustrating received signal quality determination.

FIG. 9 illustrates received signal quality determination in the case where the received physical layer signal carries a data stream comprising three transport channels using respective formats. Of course, the data stream may comprise more or fewer transport channels and the same transport format may be used by more than one of the transport channels.

Referring to FIG. 9, first, second and third transport channel quality determiners 501, 502, 503 receive the cyclic redundancy check results from respective cyclic redundancy check processes 405a, 406a, 407a and a bit error rate estimate from respective channel decoding processes 405b, 406b, 407b.

The operation of the first transport channel quality determiner 501 will now be described with reference to FIG. 10.

Figure 10:
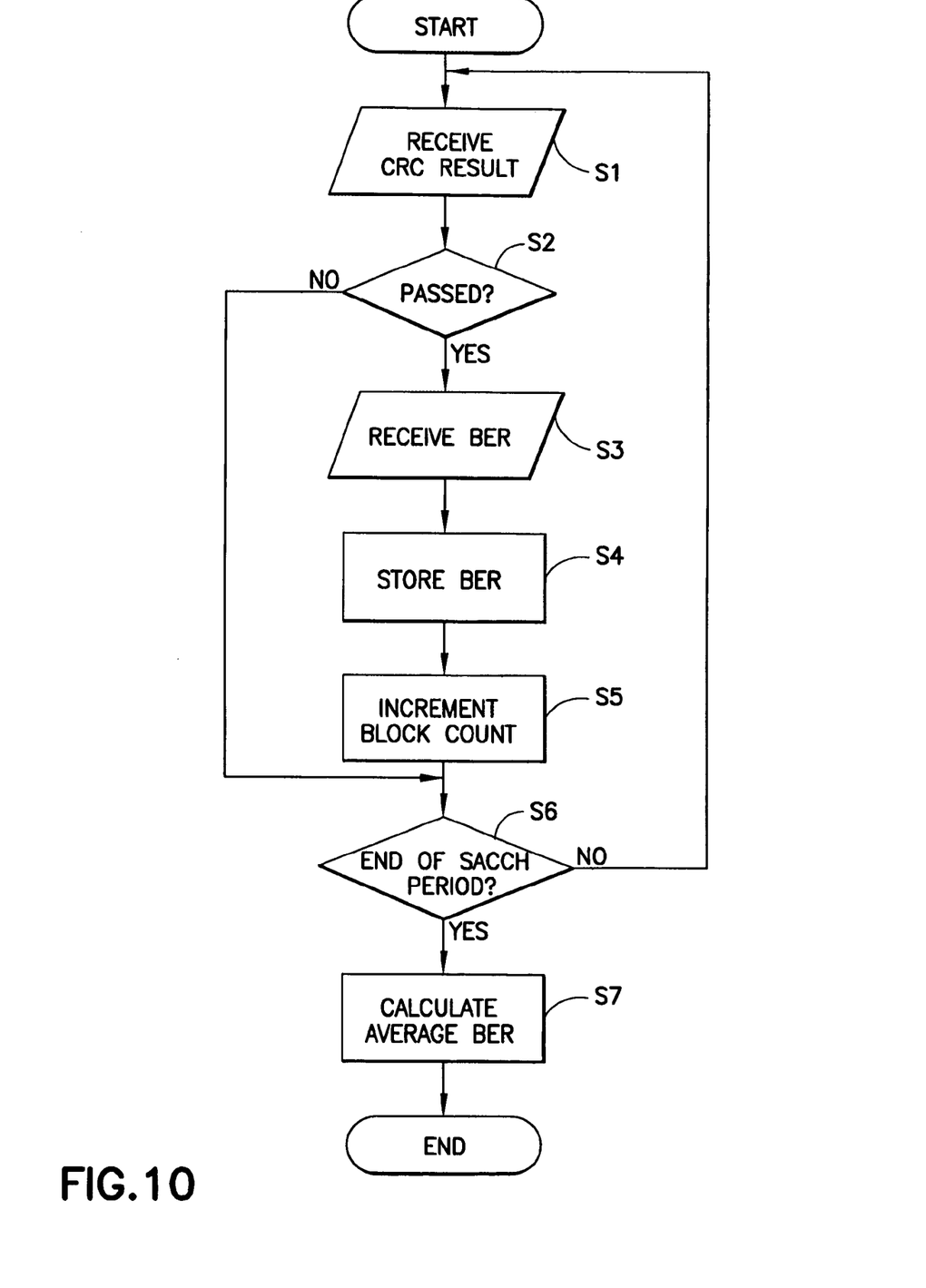
FIG. 10 is a flowchart of a first part of a received signal quality determination process.

Referring to FIG. 10, at the start of a SACCH multiframe period (also known as the SACCH reporting period), the CRC result for a first transport block is received from the first cyclic redundancy check process 405a (step s1). If the result is determined to be true, i.e. the CRC is correct, (step s2), the BER for the first transport block is obtained from the first channel decoder 405b (step s3) and stored (step s4). A block counter is then incremented (step s5). It is then determined whether the current SACCH multiframe period has come to an end (step s6).

If the current SACCH multiframe period has not come to an end (step s6), the program flow returns to step s1 where the CRC for the next block is obtained.

If, at step s2, it is determined that the cyclic redundancy check result is determined to be false, steps s3 to s5 are skipped.

When all of the blocks of the current the current SACCH multiframe period have been processed (step s6), the BER is averaged over a period corresponding to the product of the block period and the number of correctly received transport blocks, i.e. the value accumulated by the step s5.

The second and third transport channel quality determiners 502, 503 operate in the same way as the first transport channel quality determiners 501 except that the cyclic redundancy check result and the BER estimates are obtained from the corresponding cyclic redundancy check process 406a, 407a and channel decoders 406b, 407b.

The transport channel quality determiners 501, 502, 503 output their average BERs and transport block counts to a physical channel quality determiner 504.

The operation of the physical channel quality determiner 504 will now be described with reference to FIG. 11.

Figure 11:
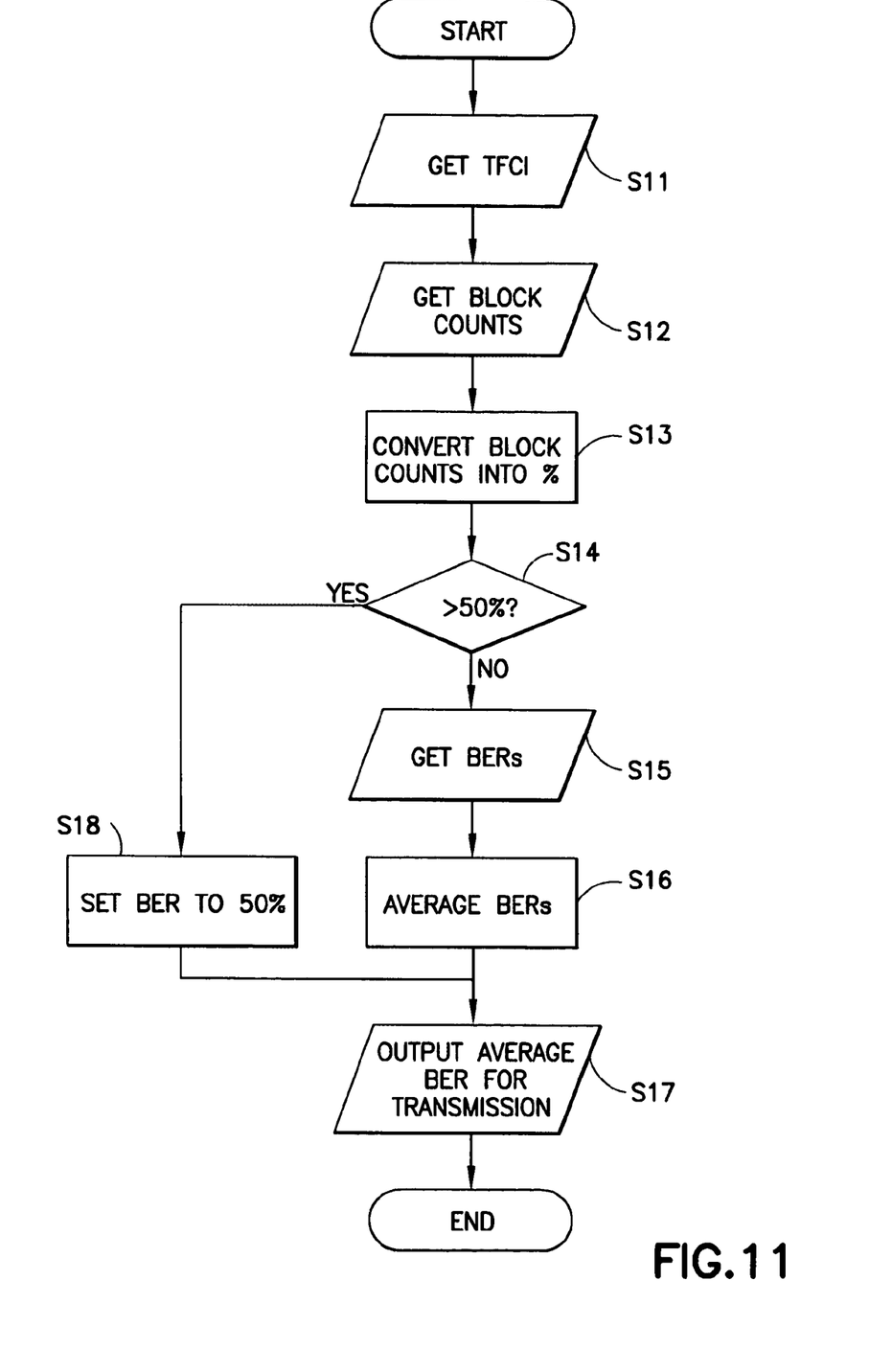
FIG. 11 is a flowchart of a second part of a received signal quality determination process.

Referring to FIG. 11, the physical channel quality determiner 504 obtains the TFCI applicable to the most recent transport channel quality determinations (step s11) and then receives the transport block counts from the transport channel quality determiners 501, 502, 503 (step s12).

The TFCI information determines what percentage of each radio packet is used by each transport channel. This information is used to convert the transport block counts into the percentage of the data in the transmitted data stream that was correctly received in one SACCH multiframe, according to:

$$P = \sum_{c=1}^{n} \frac{b(c) \cdot p(c)}{b_T(c)}$$

where c is the transport channel number, n is the number of transport channels, b is the number of correctly received bits in the transport block, $b_T$ is the number of bits in the transport block in the transmitted signal and p is the percentage of the data stream used by a particular transport channel.

If the result P is greater than or equal to 50%, the BERs are obtained from the transport channel quality determiners 501, 502, 503 (step s15). The BERs are then averaged (step s16). In the present embodiment, the BERs are averaged in accordance with the following:

$$B = \frac{\sum_{c=1}^{n} b(c) \cdot p(c)}{\sum_{c=1}^{n} p(c)}$$

where B is the average BER.

If, however, the percentage of the data in the transmitted data stream that was incorrectly received is greater than 50% (step s14), the average bit error rate B is set arbitrarily to 50%.

The average bit error rate B is then quantized and encoded into 3 bits which are made available for transmission to a base transceiver station 4 by the mobile station 6a in the SACCH as a received signal quality report.

It will be appreciated that the formulae given above are examples of the effect required and that the value ranges and scaling factors actual used may vary.

A second embodiment of the present invention will now be described.

A mobile station is as described above with the exception of the generation of the received signal quality report. In this embodiment, the report is based on the quality of the TFCI signal.

Figure 12:
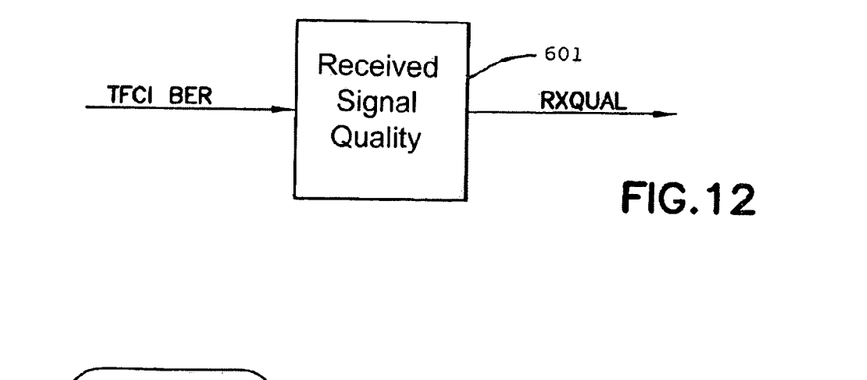
FIG. 12 is a block diagram illustrating another approach to signal quality determination.

Referring to FIG. 12, TFCI BERs are fed from the TFCI decoder 413 (FIG. 8) to a received signal quality determiner 601. The received signal quality determiner 601 generates a received signal quality signal in dependence on the TFCI BERs from the TFCI decoder 413 and outputs it for transmission in the SACCH.

Figure 13:
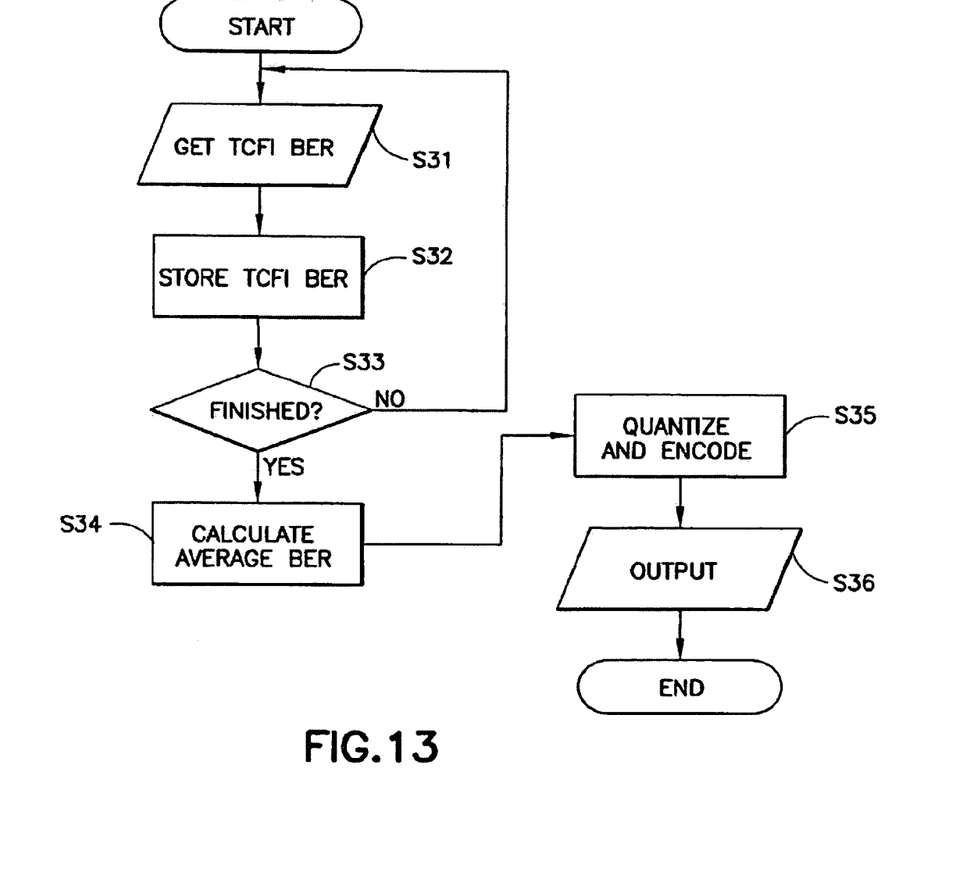
FIG. 13 is a flowchart illustrating another received signal quality determination process.

Referring to FIG. 13, the received signal quality determiner 601 obtains a first TFCI BER for the first TFCI transmitted in a SACCH multiframe period (step s31) and stores it (step s32). Successive TFCI BERs are then obtained (step s31) and stored (step s32) until the BER for the last TCFI of the current SACCH multiframe period ends (step s33).

When the last BER has been obtained and stored, the stored BERs are averaged (step s34) and then the average quantized and encoded (step s35) and output (step s36) for transmission to a base transceiver station 4 by the mobile station 6a in the SACCH as a received signal quality report.

A third embodiment of the present invention will now be described.

A mobile station is as described above with the exception of the generation of the received signal quality report. In this embodiment, the report is based on the quality of the received training sequences.

As shown in FIG. 4, each burst comprises a training sequence sandwiched between two blocks of data bits. The training sequences are predetermined.

Figure 14:
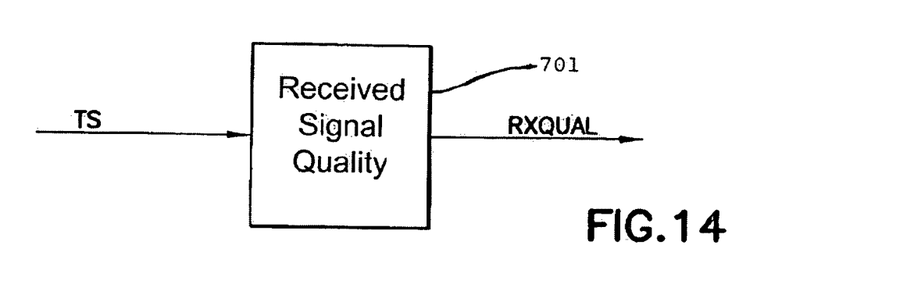
FIG. 14 is a block diagram illustrating yet another approach to signal quality determination.

Referring to Referring to FIG. 14, received training sequences are fed to a received signal quality determiner 701. The received signal quality determiner 701 generates a received signal quality signal in dependence on the received training sequences and outputs it for transmission in the SACCH.

Referring to FIG. 12, TFCI BERs are fed from the TFCI decoder 413 (FIG. 8) to a received signal quality determiner 601. The received signal quality determiner 601 generates a received signal quality signal in dependence on the TFCI BERs from the TFCI decoder 413 and outputs it for transmission in the SACCH.

Figure 15:
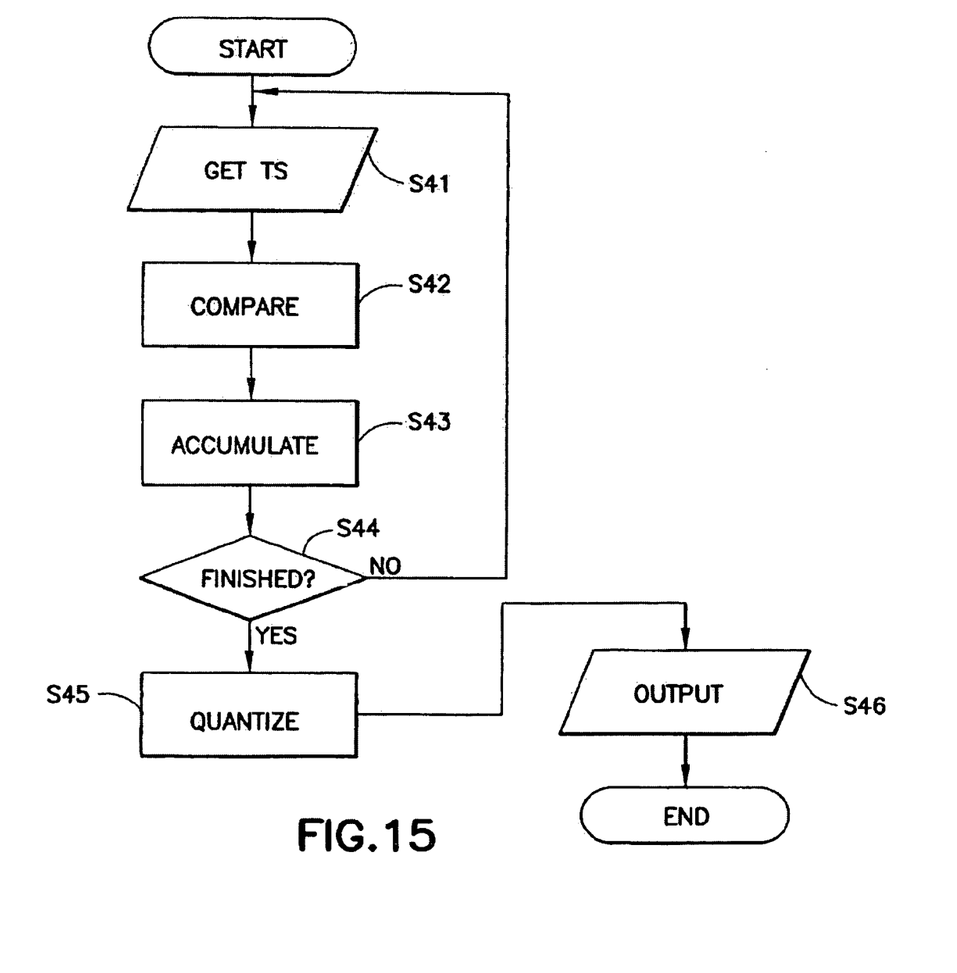
FIG. 15 is a flowchart illustrating yet another received signal quality determination process.

Referring to FIG. 15, the received signal quality determiner 701 obtains a first training sequence in a SACCH multiframe period (step s41) and compares it with a reference copy (step s42). The number of differences between the received training sequence and the reference is added to a record of the errors for the current SACCH multiframe period (step 43). The errors in successive training sequences are then obtained (step s42) and added to the error record (step s43) until the training sequence of the last burst in the current SACCH multiframe period has been processed (step s44).

When the last training sequence has been processed, the accumulated error count is quantized (step s45) and output (step s46) for transmission to a base transceiver station 4 by the mobile station 6a in the SACCH as a received signal quality report. The three embodiments described above may be combined to produce additional embodiments. For instance, bit error rates obtained by two or three techniques may be averaged to produce a bit error rate that is then quantized, encoded and transmitted to a base transceiver station 4 by the mobile station 6a in the SACCH as a received signal quality report.

It is to be understood that the foregoing embodiments are merely examples and that many modifications are possible without departing from the spirit and scope of the appended claims.

What is claimed is:

1. A method of generating a received signal quality signal in a communication system, the method comprising:
   extracting a transport channel format combination indicator from a received signal;
   processing at least two transport channel signals, contained in the received signal, in accordance with the extracted transport channel format combination indicator, said processing including at least channel decoding; and
   generating a received signal quality signal in dependence on the quality of each transport channel signal prior to channel decoding, said generating including generating an average bit error rate over the at least two transport channel signals.

2. A method according to claim 1, wherein each transport channel signal comprises a sequence of data blocks.

3. A method according to claim 2, wherein the quality of each transport channel signal is represented by a block bit error rate determined using channel decoding, if it is determined that the block passes an initial check process.

4. A method according to claim 3, wherein the determined bit error rate of a transport channel signal is averaged over a period comprising a plurality of data blocks.

5. A method according to claim 4, wherein the bit error rates of each transport channel signal are averaged over the same period.

6. A method according to claim 1, wherein the average bit error rate is weighted in dependence on the transport formats used for said transport signals.

7. A method according to claim 1, including the step of transmitting the received signal quality signal in a control channel.

8. A communication device comprising:
   a receiver for receiving a signal from a physical channel;
   processing means configured for:
      extracting a transport channel format combination indicator from the received signal;
      processing at least two transport channel signals, contained in the received signal, in accordance with the extracted transport channel format combination indicator, said processing including at least channel decoding; and
      generating a received signal quality signal in dependence on the quality of each transport channel signal prior to channel decoding, said generating including generating an average bit error rate over the at least two transport channel signals.

9. A device according to claim 8, wherein the processing means is configured for processing transport channel signals comprising sequences of data blocks.

10. A device according to claim 9, wherein the quality of each transport channel signal is represented by a block bit error rate determined using channel decoding, if it is determined that the block passes an initial check process.

11. A device according to claim 10, wherein the processing means is configures such that the determined bit error rate of a transport channel signal is averaged over a period comprising a plurality of data blocks.

12. A device according to claim 11, wherein the processing means is configured such that the bit error rates of each transport channel signal are averaged over the same period.

13. A device according to claim 12, wherein the average is weighted in dependence on the transport formats used for said transport signals.

14. A device according to claim 8, including a transmitter, wherein the processing means is configured for causing the transmitter to transmit the received signal quality signal in a control channel of a communication network.

15. A method of generating a received signal quality signal in a communication system, the method comprising:
   receiving a signal from a physical channel, the signal comprising one or more transport channels;
   extracting a transport channel format combination indicator from the received signal and determining the bit error rate therefor; and
   generating a received signal quality signal in dependence on the bit error rate of the extracted transport channel format combination indicator,
   wherein the determined bit error rates of a plurality of transport channel format combination indicator instances are averaged.

16. A method of generating a received signal quality signal in a communication system, the method comprising:
   receiving a signal from a physical channel, the signal comprising one or more transport channels;
   extracting a transport channel format combination indicator from the received signal and determining the bit error rate therefor;
   generating a received signal quality signal in dependence on the bit error rate of the extracted transport channel format combination indicator; and
   transmitting the received signal quality signal in a control channel.

17. A communication device comprising:
   a receiver for receiving a signal from a physical channel, the signal comprising one or more transport channels; and
   processing means configured for:
   extracting a transport channel format combination indicator from a received signal and determining the bit error rate therefor; and generating a received signal quality signal in dependence on the bit error rate of the extracted transport channel format combination indicator, and
   wherein the processing means is further configured for averaging the determined bit error rates of a plurality of transport channel format combination indicator instances.

18. A communication device comprising:
   a receiver for receiving a signal from a physical channel, the signal comprising one or more transport channels;
   a transmitter; and
   processing means configured for:

extracting a transport channel format combination indicator from a received signal and determining the bit error rate therefor; and generating a received signal quality signal in dependence on the bit error rate of the extracted transport channel format combination indicator, and wherein the processing means is further configured for causing the transmitter to transmit the received signal quality signal in a control channel of a communication network.

19. A processor-readable medium containing processor-executable instructions that, when executed by a processor, cause the processor to implement a method of generating a received signal quality signal in a communication system, the method comprising:

extracting a transport channel format combination indicator from a received signal;

processing at least two transport channel signals, contained in the received signal, in accordance with the extracted transport channel format combination indicator, said processing including at least channel decoding; and generating a received signal quality signal in dependence on the quality of each transport channel signal prior to channel decoding, said generating including generating an average bit error rate over the at least two transport channel signals.

20. The medium according to claim 19, wherein each transport channel signal comprises a sequence of data blocks.

21. The medium according to claim 20, wherein the quality of each transport channel signal is represented by a block bit error rate determined using channel decoding, if it is determined that the block passes an initial check process.

22. The medium according to claim 21, wherein the determined bit error rate of a transport channel signal is averaged over a period comprising a plurality of data blocks.

23. The medium according to claim 22, wherein the bit error rates of each transport channel signal are averaged over the same period.

24. The medium according to claim 19, wherein the average bit error rate is weighted in dependence on the transport formats used for said transport signals.

25. A processor-readable medium containing processor-executable instructions that, when executed by a processor, cause the processor to implement a method of generating a received signal quality signal in a communication system, the method comprising:

receiving a signal from a physical channel, the signal comprising one or more transport channels;

extracting a transport channel format combination indicator from the received signal and determining the bit error rate therefore; and generating a received signal quality signal in dependence on the bit error rate of the extracted transport channel format combination indicator, wherein the determined bit error rates of a plurality of transport channel format combination indicator instances are averaged.

* * * * *